United States Patent
Altvater et al.

(10) Patent No.: US 6,208,635 B1
(45) Date of Patent: Mar. 27, 2001

(54) NETWORK FOR TRANSFERRING DATA PACKETS AND METHOD FOR OPERATING THE NETWORK

(75) Inventors: Ulrich Altvater, Bad Rappenau; Heinrich Baron, Brühl; Bernhard Bitsch, Mannheim; Peter Haaf, Heidelberg; Bernd Kieslich, Sinsheim; Jürgen Müller, Neudenau-Herbolzheim, all of (DE)

(73) Assignee: Altvater Air Data Systems, GmbH & Co. KG, Bad Rappenau (DE)

(*) Notice: Subject to any disclaimer, the term of this patent is extended or adjusted under 35 U.S.C. 154(b) by 0 days.

(21) Appl. No.: 08/769,510

(22) Filed: Dec. 19, 1996

(30) Foreign Application Priority Data

Dec. 12, 1996  (DE) ............................................... 196 51 708

(51) Int. Cl.⁷ ............................... H04J 1/00; H04L 25/49
(52) U.S. Cl. .......................... 370/343; 370/350; 375/293
(58) Field of Search ................................... 370/343, 344, 370/319, 324, 338, 350, 364, 320, 321, 322, 323, 331, 332, 337; 455/502, 503, 507, 11.1; 375/202, 203, 293, 356, 206, 132, 136, 137, 138

(56) References Cited

U.S. PATENT DOCUMENTS

| | | | |
|---|---|---|---|
| 3,646,444 | * 2/1972 | Bitzer | 325/58 |
| 5,388,102 | * 2/1995 | Griffith et al. | 375/356 |
| 5,412,654 | * 5/1995 | Perkins | 370/331 |
| 5,442,659 | * 8/1995 | Bauchot et al. | 375/202 |
| 5,459,759 | 10/1995 | Schilling . | |
| 5,479,400 | * 12/1995 | Dilworth et al. | 370/332 |
| 5,509,027 | * 4/1996 | Vook et al. | 375/202 |
| 5,619,493 | * 4/1997 | Ritz et al. | 370/433 |
| 5,822,361 | * 10/1998 | Nakamura et al. | 375/202 |
| 5,862,142 | * 1/1999 | Takiyasu | 370/350 |

FOREIGN PATENT DOCUMENTS

| | | |
|---|---|---|
| 44 07 544 A1 | 9/1995 | (DE) . |
| 0 709 983 A1 | 5/1996 | (EP) . |
| WO 95/24080 | 9/1995 | (WO) . |

\* cited by examiner

Primary Examiner—Chi H. Pham
Assistant Examiner—Steven Nguyen
(74) Attorney, Agent, or Firm—Knobbe, Martens, Olson & Bear, LLP

(57) ABSTRACT

A network for transferring data packets has at least two basic networks, each with a central station and a limited number of user stations. The respective central station connects the associated basic network to other basic networks. The data packets are transferred over a set of channels with the frequency-hopping method and the channels are in this context selected for data transfer in accordance with at least one frequency-hopping pattern in temporal succession. A separate frequency-hopping pattern that is orthogonal to the frequency-hopping patterns of immediately adjacent basic networks is processed in each basic network.

12 Claims, 4 Drawing Sheets

NETWORK FOR TRANSFERRING DATA PACKETS AND METHOD FOR OPERATING THE NETWORK

BACKGROUND OF THE INVENTION

1. Field of the Invention

The present invention relates to a network for transferring data packets, with multiple user stations and at least one central station which connects the network externally, the data packets being transferred over a set of channels with the frequency-hopping method and the channels being in this context selected for data transfer in accordance with at least one frequency-hopping pattern in temporal succession; as well as a method for operating a network of this kind.

2. Related Prior Art

A network of this kind and a method for operating it are known from DE 44 07 544 A1.

The known network and the known method are used to transfer data packets in an auxiliary network which transmits via frequency channels that are at least in part already used in an existing wireless or radio network for digital data and/or voice transfer. With this method, in a first step a frequency channel not currently occupied by the wireless network is identified, whereupon in a second step a data packet is transferred over the identified frequency channel. These steps are repeated, using frequency-hopping technology, until all the data packets of a transmission have been transferred.

With this method, the determination of a frequency channel not currently occupied by the wireless network takes place in such a way that one of the multiple frequency channels is first selected, whereupon this selected channel is then listened in on to check whether the wireless network is currently transmitting on that frequency channel. If no signal is received during this listening-in process, it is assumed that this channel can be used by the auxiliary network.

If it is found, however, that the selected channel is currently being used by a primary user, the time slot elapses unused, i.e. no data packet is transferred over the selected channel so as not to disrupt the primary user.

With the known method, by using frequency-hopping technology it is possible to utilize existing channels better without disturbing the respective wireless network.

As is common in frequency-hopping technology, the individual data packets are transferred in temporally staggered fashion over various frequency channels, the load being evenly distributed among the available channels that are not currently being used by the wireless network.

With regard to further details of the known method, reference is made to DE 44 07 544 mentioned above.

Initial tests of the known method have revealed that it operates properly without impairing the wireless network. Operation of an auxiliary network on the D1 or D2 network therefore presents no problems.

The known network is a decentralized network in which the central station on the one hand specifies the internal system time and on the other hand provides the external connection for the individual user stations. The user stations can communicate both with one another and with the central station.

A separate frequency-hopping pattern is assigned to each user station, so that each user station is reachable at any time. The channel over which this is possible is determined from the system time and the address of the particular user station. To prevent collisions from occurring in the network, the frequency-hopping patterns of the individual user stations are orthogonal to one another, i.e. at any given point in time, each of the available channels is used only once within the network.

If the frequency range allows 80 different channels, for example, 79 user stations and one central station can therefore be provided in the network. A network of this kind can be connected via the central station to a further network also with 79 user stations and one central station.

Since multiple transmissions can be carried out simultaneously within a network, data throughput through the network is very high, even though it is simply overlaid on the wireless network of primary users.

Although the network of user stations so far described operates very reliably with high data throughput, a number of disadvantages leading to a perceptible reduction in data throughput have nevertheless been noted during operation.

For example, it often happens that two adjacent user stations which are associated with two adjacent networks accidentally receive data over the same channel because their two frequency-hopping patterns have the same channel in the current time slot. If these two user stations are located sufficiently close to one another, they then interfere with each other so that both data packets are lost. The reason is that the user stations cannot unequivocally assign the data packets, so that they also cannot confirm receipt of the data packet to the transmitting station. The lost data packet must then be re-transferred in the next time slot in each network.

These types of interference occur particularly at the edges of a network, where it touches or in fact overlaps adjacent networks.

A further problem with the known network crops up if one of two adjacent user stations is currently transmitting while the other has switched over to receiving. Although these two user stations are receiving or transmitting data over different channels, the transmitting user station still prevents reception by the other user station, since its strong transmitted signal can lead to saturation of the input amplifier of the other user station. When saturation of this kind occurs, the receiving user station is no longer capable of distinguishing between the data packet intended for it and the data packet, not intended for it, being sent out by the adjacent user station. The data packet intended for the receiving user station is thus lost, so that it must be repeated in the next time slot.

Particularly when the user stations have a high spatial density, the two problems described above cause a large number of the transferred data packets to "get lost," so that the potential data throughput is by no means achieved. The greater the number of user stations in a particular area, the more evident the aforesaid problems become.

SUMMARY OF THE INVENTION

In view of the above, it is an object of the present invention to improve the method and the network described at the outset in such a way that networking of any number of user stations becomes possible with no loss of data throughput.

In the case of the method described at the outset, this object is achieved according to the invention by the fact that the network is divided into at least two basic networks, each with a central station and a limited number of user stations; and that in each basic network a separate frequency-hopping pattern is processed that is orthogonal to the frequency-hopping pattern of immediately adjacent basic networks.

Correspondingly, the underlying object of the invention is achieved, in the case of the network mentioned at the outset, by the fact that it has at least two basic networks each with a central station and a limited number of user stations; and that a separate frequency-hopping pattern that is orthogonal to the frequency-hopping patterns of immediately adjacent basic networks is allocated to each basic network.

The object underlying the invention is thereby completely achieved.

Specifically, the inventors of the present application have recognized that, surprisingly, the overall data throughput is not perceptibly decreased if the network is divided into multiple basic networks each with a few user stations and one central station, only one frequency-hopping pattern now being processed in each basic network. Although this means that within a so-called "time slot," only one user station can transfer data in each basic network, interference with adjacent user stations is, however, thereby prevented even when the density of user stations is very high.

The orthogonality of the frequency-hopping patterns of adjacent basic networks moreover prevents two different data packets from being transported on one and the same channel in the edge or overlap regions of two immediately adjacent basic networks. The orthogonality requirement is necessary, however, only for immediately adjacent basic networks, i.e. those lying in one another's wireless ranges: the next-but-one basic network can in each case once reuse a frequency-hopping pattern that is already being used by a different basic network.

A further advantage here is that the number of user stations can now be of any desired magnitude even in a very small area: the basic networks located in one another's wireless ranges must simply use frequency-hopping patterns that are orthogonal to one another. Because it is now possible to reuse frequency-hopping patterns and therefore channels, data throughput can thereby in fact be increased with no possibility of collisions occurring. Moreover the capacity per network is now no longer limited by the maximum number of available channels, so that the number of user stations, and thus the data throughput, can be considerably increased.

Although user stations from adjacent basic networks that, in the case of the network according to the prior art, could still communicate directly with one another must now exchange data packets via their respective central stations, the disadvantage resulting from this time delay is nevertheless, surprisingly, more than compensated for by the fact that almost no mis-transfers, i.e. lost data packets, occur.

In addition, each user station can no longer receive or transmit in each time slot; but this is an insignificant disadvantage if the number of user stations per basic network is relatively small. The reason is that it has further been found that for most user stations, continuous availability of a station is often not at all necessary, so that in most cases there is no loss of data throughput for the individual user stations.

If all user stations within a basic network are operating simultaneously with the same frequency-hopping pattern, load-dependent granting of transmission authorization is moreover possible. This means that although the channel over which a data packet can be transferred is precisely established by means of the frequency-hopping pattern for each time slot, the particular user station assigned to the time slot does not, however, need to be defined statically. With a static assignment of time slots of this kind, and a basic network having 16 user stations and 80 channels, each user station would receive a transmission authorization only five times within the frequency-hopping pattern.

But because different user stations can have a completely different data volume at different times, a large number of time slots are thereby lost for actual data transfer, specifically if the user stations having a transmission authorization for the particular time slot cannot receive or send data packets. By means of a dynamic, i.e. load-dependent, allocation of transmission authorization, the data throughput through a basic network can now be once again greatly increased.

It is preferred in this context if each basic network services up to 256, preferably only up to 20, user stations.

This has the advantage, already indicated above, that almost no loss of data throughput is evident at the individual user stations.

In general, it is preferred if the set of channels lies in a frequency band that is used by primary users, such that before a potential data transfer, a particular channel selected by the network of user stations is checked to determine whether a primary user is using that channel at the time, and as a function of that check either a data packet is transferred over the selected channel, or the next channel in the particular frequency-hopping pattern is selected for checking and potential data transfer.

The advantage here is that the new method can be used in conjunction with the overlay method known from DE 44 07 544 A1 mentioned above. A large number of frequency bands that are already being otherwise used is thus available. The inventors of the present application have, specifically, recognized that utilization of the channels by the primary users is generally so low that an overlay network can be operated without either disruption to the primary user or insufficient data throughput in the overlay network. Occupation of the channels by the primary users is in fact so low that despite the check using the "listen before talking" method described above, as a rule very few time slots are not available for data transfer, i.e. can negatively influence the quality of a real-time transfer.

It is further preferred with the new method if the user stations of a basic network are operated synchronously with one another and reciprocally with respect to the particular central station; and if preferably the basic networks are synchronized with one another in such a way that all the central stations are transmitting or receiving simultaneously.

The advantage here is that mutual interference is even further reduced. The result of synchronizing the individual basic networks with one another is that the orthogonality of the frequency-hopping patterns is retained even during extended operating periods, so that drift does not occur. A further advantage is the fact that it is now no longer possible, either within a basic network or between adjacent basic networks, for one of two adjacent user stations to be transmitting and the other to be "clogged" even though it is receiving on a different channel.

It is accordingly preferred, in the case of the new network, if each central station synchronizes a system time in the associated basic network; and if the network comprises a synchronization station, connected to the central stations, which generates and emits a synchronizing signal by means of which the individual system times of the basic networks are synchronized with one another.

The advantage here is that global synchronization of all the basic networks is achieved, so that all the user stations are either transmitting or receiving while the central stations, operating reciprocally with respect to the user stations, are all simultaneously either receiving or transmitting.

It is thus now possible to arrange not only user stations but also central stations in physically close proximity to one another without having the high transmission output of the central stations result in disruption (clogging) of adjacent central stations that wish to receive at that time. A further advantage of global synchronization is that the orthogonality of the frequency-hopping patterns of immediately adjacent basic networks is not lost over time, so that this source of interference is also ruled out.

The new method and the new network therefore nevertheless make possible very reliable transfer of data packets with a very high data throughput, even when the user stations are in very close physical proximity.

It is further preferred with the new method if two central stations exchange data packets with one another with interposition of a user station.

The advantage here is that the central stations can be of very simple design: just like a user station, they can or must either transmit or receive data packets during a time slot. This is advantageous in particular for global synchronization of the user stations and central stations, since complex intermediate storage, etc. of the data packets is not necessary.

Correspondingly, it is preferred in the case of the new network if at least one central station is connected, preferably on a hardware basis, to a user station of an adjacent basic network.

The advantage here is that the user station connecting the two central stations needs to be part of only one basic network, so that no particular precautions need to be taken in terms of the adjacent frequency-hopping pattern. The result is a kind of cascaded network, in which even central stations that have no line-of-sight or hardware connection to one another can exchange data packets or synchronization signals.

A further advantage of this structure is that the network can be dynamically expanded with no need to pay attention to the relative location of the central stations. When a new basic network is set up, it is grouped around a new central station that simply needs to be connected on a hardware basis to a user station of an already existing basic network. In this manner, all the user stations of the new basic network are connected directly to all the other user stations and central stations.

It is further preferred in this context if at least one central station is connected on a hardware basis to the synchronization station.

The advantage here is that the synchronization signal from the synchronization station can be forwarded directly, i.e. without using a time slot and therefore with no loss of transfer capacity. It is of course possible to connect multiple central stations to the synchronization station on a hardware basis.

The central stations for which this is not possible receive the synchronization signal as a data packet, via a user station to which they are connected on a hardware basis.

In general, it is also preferred if a central station and/or a user station have one transmission and one reception antenna.

The advantage here is that compared with an ordinary antenna multiplexer, electronic locking of the input circuit of the receiving antenna is possible, so that when the particular central or user station is itself transmitting, the receiver cannot be damaged or saturated to the point that is has not yet recovered when reception occurs immediately after the transmission is complete.

Further advantages are evident from the description and the attached drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

An embodiment of the invention is shown in the drawings and will be explained further in the description below. In the drawings.

DETAILED DESCRIPTION OF THE PREFERRED EMBODIMENT

Figure 1:
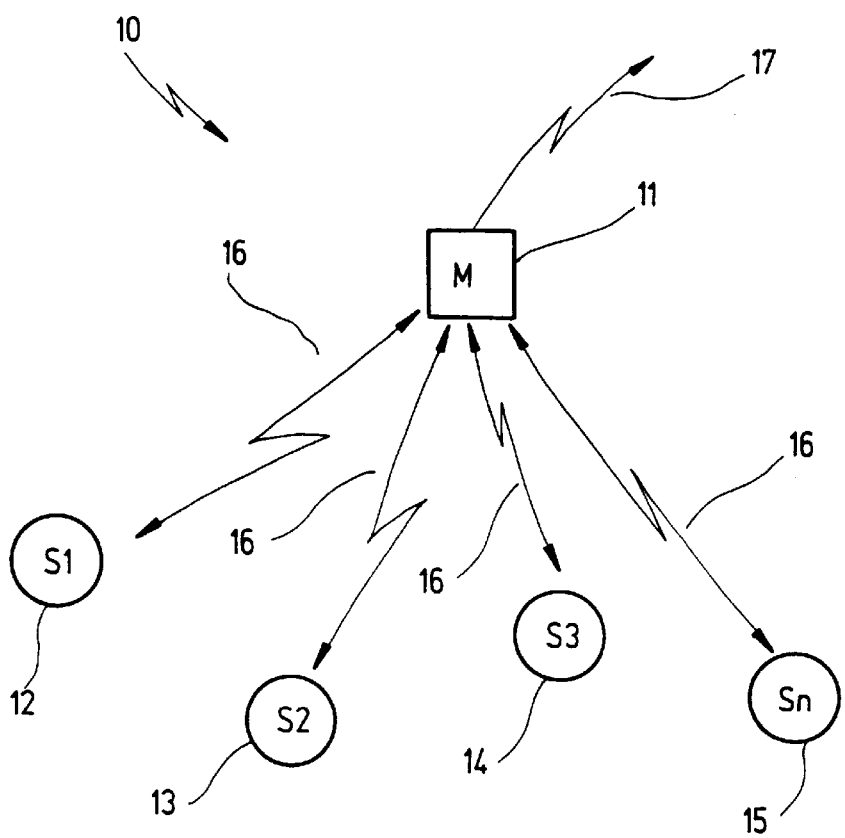
FIG. 1 shows a schematic example of a basic network with user stations and a central station.

FIG. 1 schematically shows a basic network 10 that comprises a central station 11 and multiple user stations 12, 13, 14, and 15. User stations 12, 13, 14, and 15 are connected via internal wireless links 16 to central station 11, which in turn is connected via an external wireless link 17 to further stations.

Basic network 10 is hierarchically structured: user stations 12, 13, 14, and 15 can communicate with one another only via central station 11. Contact with further external stations also takes place via central station 11.

Figure 2:
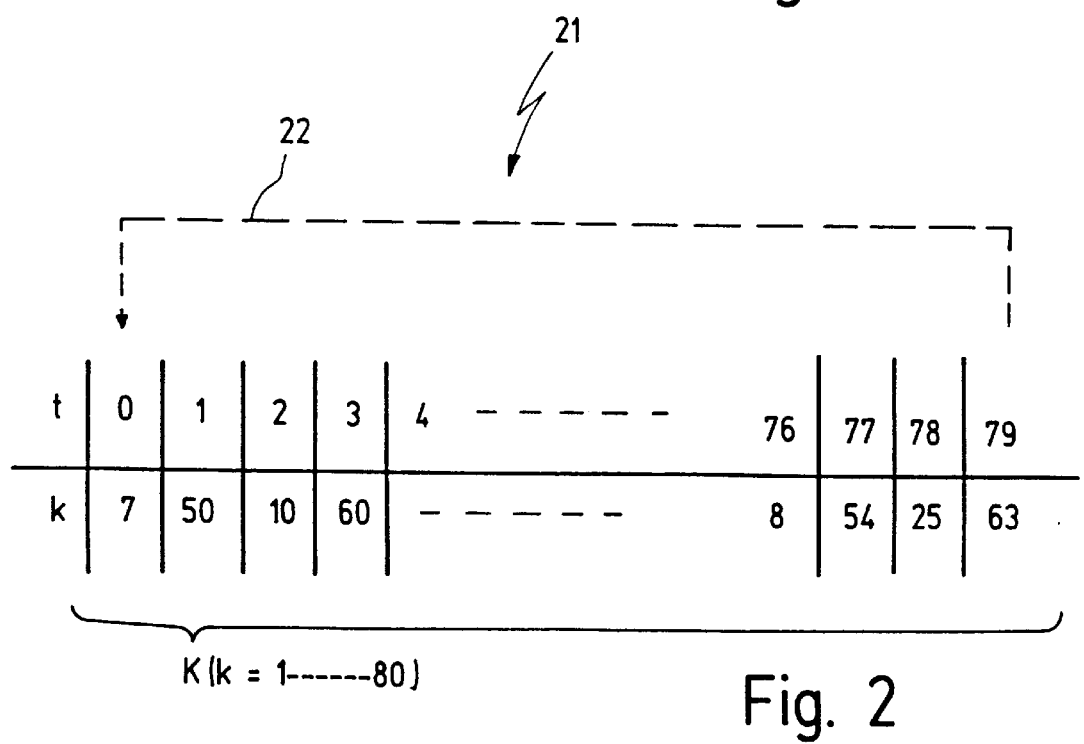
FIG. 2 shows a schematic example of a frequency-hopping pattern used by the basic network of FIG. 1.

Basic network 10 uses for data transfer the channels of a frequency spectrum (described in more detail in conjunction with FIG. 3) with the frequency-hopping method. To this end, a frequency-hopping pattern 21 shown in FIG. 2 is stored both in central station 11 and in each of user stations 12, 13, 14, 15, and is cycled through as indicated by arrow 22.

In the example shown, a set K(k=1 to 80) of 80 channels is arranged, statistically distributed, in frequency-hopping pattern 21 in such a way that the greatest possible spacing exists between the phases of two successive channels K(k), so that interference due to multiple reflections which may occur on the one channel is avoided on the next channel with high reliability.

Basic network 10 operates with a system time which defines successive time slots, a data transfer between central station 11 and one of user stations 12, 13, 14, 15, or an external station, occurring in each time slot over the respective valid channel. For example, transfer occurs over channel 7 in the time slot at time t=0, while transfer occurs over channel 54 in time slot t=77.

Frequency-hopping pattern 21 is cycled through so that time slot t=79 is once again followed by time slot t=0. The particular user station 12, 13, 14, or 15 for which a transmission of central station 11 is intended is governed by an address that central station 11 prefixes to the data packet for transmission in the respective time slot. In other words, while the system time (by way of the time slot) determines the particular channel to be used, central station 11 indicates the addressee during the data transfer. Moreover, information is provided during that data transfer as to which user station 12, 13, 14, 15 obtains transmission authorization in the next time slot. The channel of the next time slot is determined by frequency-hopping pattern 21 of FIG. 2.

In addition to its respective data packets, user stations 12, 13, 14, 15 also convey to central station 11 information regarding the number of data packets still to be transferred, so that central station 11 can grant transmission authorization on a load-dependent basis. To ensure that a user station 12, 13, 14, 15 with a high data volume does not completely exclude the other user stations 13, 14, 15, 12 from transferring, transmission authorization is granted not solely on the basis of data volume but also in accordance with how much time has elapsed since the last data transfer by the particular user station 13, 14, 15, 12.

Basic network 10 thus makes possible an asynchronous, load-dependent transfer of data packets, the data throughput being optimized by hierarchical granting of transmission authorizations.

Basic network 10 described so far does not, however, operate in one exclusive frequency range; it is rather an auxiliary network that is overlaid on an existing network, as will now be described with reference to FIG. 3.

Figure 3:
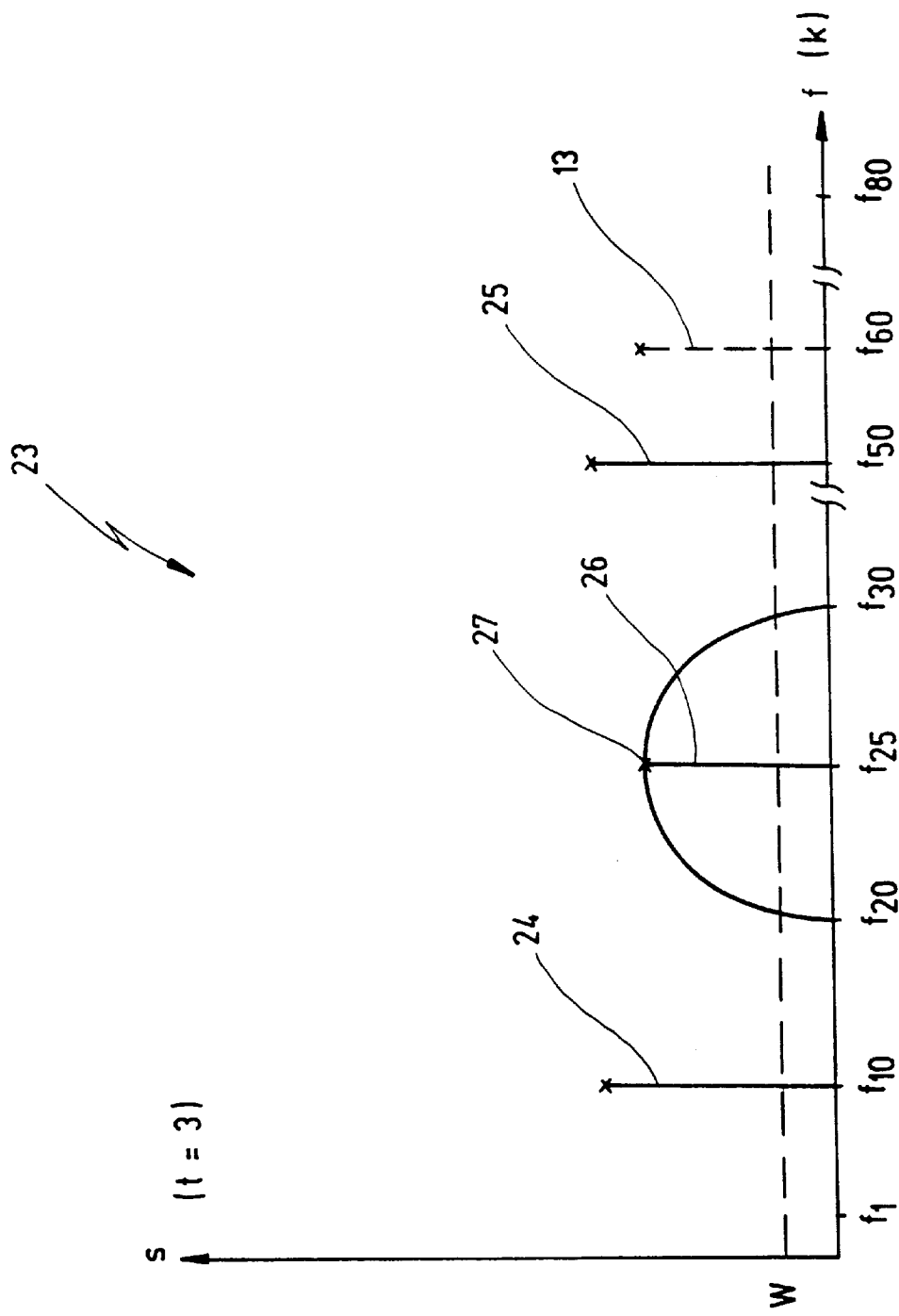
FIG. 3 shows a schematic example of a frequency spectrum of a wireless network onto which the basic network of FIG. 1 is overlaid.

FIG. 3 schematically shows a frequency spectrum 23, used by primary users, that is also used by the user stations of the basic network of FIG. 1 as a kind of "auxiliary network." The frequency spectrum comprises, for example, f(k) channels $f_1$ to $f_{80}$; at $f_{10}$ and $f_{50}$ a primary user 24, 25 is transmitting, while user station 13 is located at $f_{60}$. The auxiliary network is therefore operating currently at system time t=3.

In addition to the very narrow-band primary users 24, 25 and user station 13, a further primary user 26 is also present, the center frequency of which is located at $f_{25}$. This primary user 26 is, however, extremely broad-band, and has a spectral bell curve 27 extending from $f_{20}$ to $f_{30}$. In the edge regions of this bell curve, however, i.e. above $f_{20}$ and below $f_{30}$, transmission energy S of primary user 26 is so low that it falls below a detectable threshold W, so that a user station would not be able to receive a signal on, for example, channels $f_{21}$ or $f_{29}$, and would therefore consider those channels unoccupied.

As already mentioned, the user stations use channels $f_1$ to $f_{80}$ for data transfer using frequency-hopping technology, such that in order to prevent disruption of primary users, at the beginning of each potential data transfer a check is made as to whether the particular frequency channel currently selected is occupied by primary users. The basic method is described in detail in DE 44 07 544 A1 mentioned above, so that further explanations is unnecessary here.

At each point in time, a transmitting or receiving user station therefore knows the channel over which that transmission is to occur. To ensure that this potential transmission does not disrupt a primary user, prior to transmission of a data packet in the particular time slot a check is made as to whether the selected channel is currently occupied by a primary user. The individual operations required for this purpose will now be discussed with reference to the schematic representation in FIG. 4.

Figure 4:
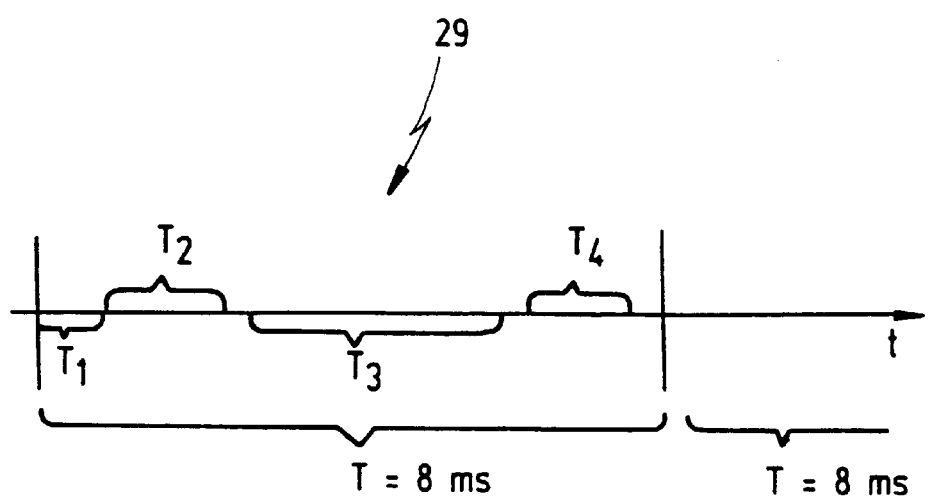
FIG. 4 shows how a time slot of the basic network of FIG. 1 is distributed among the various operations.

FIG. 4 shows, on the time axis, a schematically indicated time slot 29 of T=8 ms. At the beginning of this time slot 29, the user station's transmitter is first set to the selected channel; this takes place during time period $T_1$=50 ns.

The occupancy status of that channel is then interrogated during time period $T_2$=500 μs. If the channel is unoccupied, a data packet is then transferred during time period $T_3$ which is adjacent (although not directly) to $T_2$; 4 ms are available for this. This data packet consists in known fashion of a header, a data packet, and a trailer.

After transfer of the data packet, there is still a certain waiting period at $T_4$ for the receiver to confirm receipt of the data packet. If this confirmation arrives, the next data packet is transferred in the next time slot; if there is no confirmation, the same data packet is transferred once again in the next time slot.

If it is found, during the check in $T_2$, that the selected channel is already occupied by primary users, the remainder of the time in the time slot elapses unused, and the operations just described begin again at the star t of the next time slot.

Basic network 10 of FIG. 1 as described so far is capable of adapting itself to varying load conditions, this being achieved by asynchronous transfer of data packets with load-dependent allocation of transmission authorization by central station 11.

Figure 5:
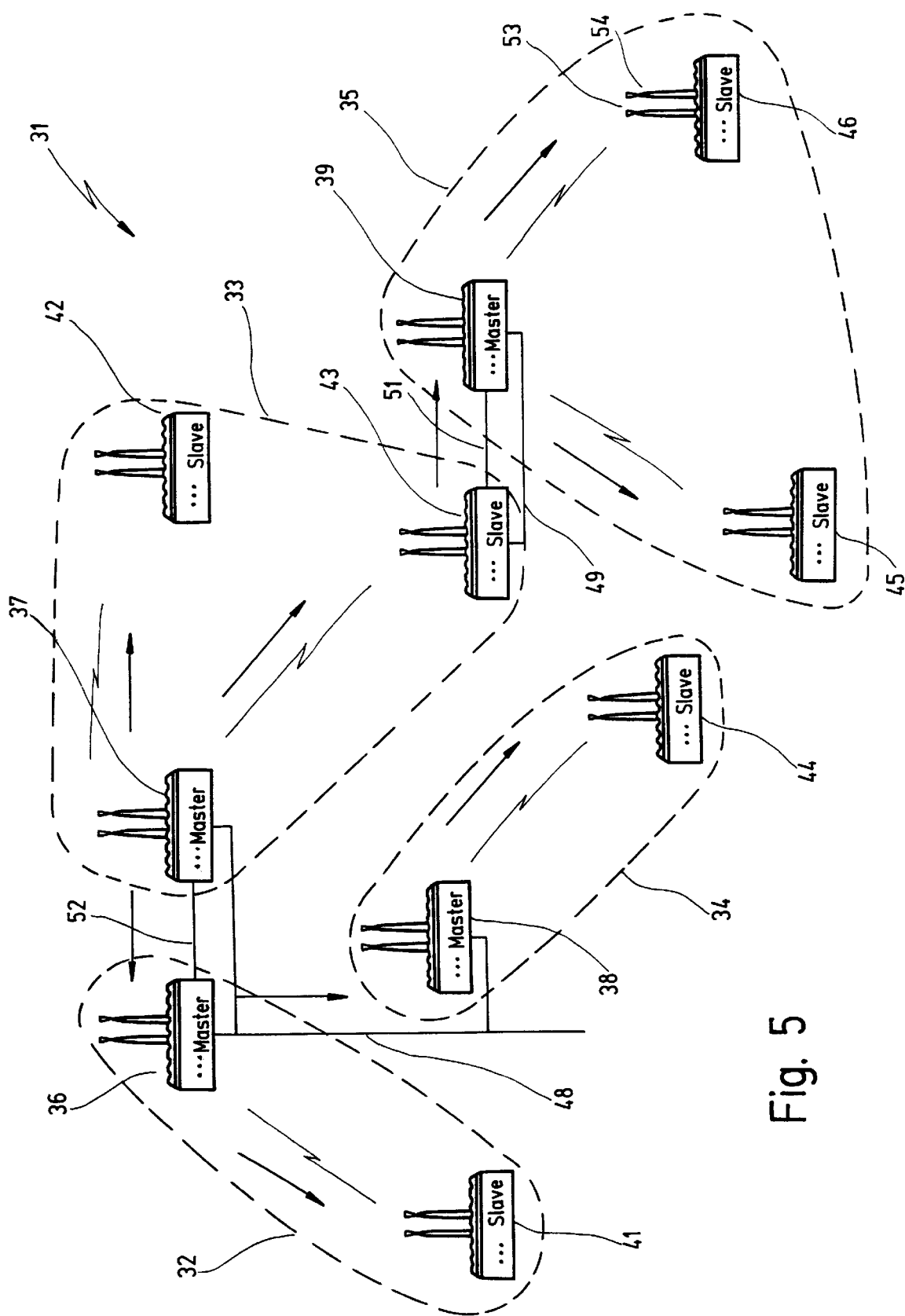
FIG. 5 shows a schematic representation of a network of user stations constructed from multiple basic networks.

FIG. 5 schematically shows a network 31 made up of multiple basic networks 32, 33, 34, 35. Each basic network 32, 33, 34, 35 is internally designed, in principle, like basic network 10 of FIG. 1. Each of basic networks 32, 33, 34, 35 comprises a central station 36, 37, 38, 39 and one or more user stations 41, 42, 43, 44, 45, 46. The dashed lines show the correlation between each respective central station and the associated user stations. In FIG. 5 the central stations are moreover labeled "Master" and the user stations "Slave," as is common in this field of art.

Central station 37 functions simultaneously as a synchronization station, being connected via a synchronization bus 48 to central stations 36 and 38. Central station 37 generates a synchronization signal that is forwarded on the one hand via the hardware connection of synchronization bus 48 to masters 36 and 38, and from them wirelessly to user stations 41 and 44, respectively.

On the other hand, central station 37 sends the synchronization signal wirelessly as a data packet to its user stations 42 and 43. User station 43 is connected on a hardware basis via a synchronization bus 49 and via a data bus 51 to central station 39 of basic network 35. The synchronization signal is conveyed to central station 39 via synchronization bus 49, while data packets are forwarded via data bus 51.

Central station 39 in turn sends the synchronization signal to user stations 45 and 46 of basic network 35.

A cascaded network 31 is thus constituted, logically divided into multiple basic networks 32, 33, 34, 35. Within a basic network 32, 33, 34, 35, the respective central station 36, 37, 38, 39 handles data traffic from and to user stations 41, 42, 43, 44, 45, 46. Communication between adjacent basic networks occurs in a manner shown as follows using the example of basic networks 33 and 35:

Central station 37 of basic network 33 conveys data packets to "its" user station 43, which in turn is connected on a hardware basis, via synchronization bus 49 and data bus 51, to master 39 of adjacent basic network 35. In principle, there can be a connection between any desired number of user stations of a basic network and the central station of a subsequent basic network, so that the resulting overall structure is either tree-like or also net-like.

A purely hierarchical tree structure is necessary only for the distribution (indicated by arrows) of the synchronization signal. Only the system clock in central station 37 is highly accurate; the system clocks in the other central stations and in the user stations are of much simpler design, but are cyclically synchronized by the synchronization signal of central station 37, which in this instance acts as the synchronization station.

This ensures that the system time in the entire network 31 is identical everywhere to within a few nanoseconds, so that the time slots in all the basic networks 32, 33, 34, 35 are synchronous with one another.

Network 31 of FIG. 5 is then operated so that all the user stations 41, 42, 43, 44, 45, 46 switch at the same time either to transmission mode or to reception mode. Central stations 36, 37, 38, 39 operate reciprocally with respect to user stations 41, 42, 43, 44, 45, 46, so that they switch at the same time to reception or transmission, respectively.

Physically adjacent central stations, for example central stations 36 and 37, can moreover be interconnected by means of a hardware connection indicated at 52, so that they do not require an additional user station for mutual data exchange as is the case for central stations 37 and 39 with user station 43.

Because of this synchronized reciprocal operation, it is impossible for one of two adjacent stations to be transmitting and thus to saturate the adjacent receiving station.

Associated with each basic network 32, 33, 34, 35 is a separate frequency-hopping pattern, the frequency-hopping patterns of adjacent basic networks being orthogonal to one another. This will now be explained in more detail with reference to frequency-hopping pattern 21 of FIG. 2.

Let it be assumed that frequency-hopping pattern 21 shown in FIG. 2 is associated with basic network 32. The frequency-hopping pattern of basic network 33 is intended to correspond to frequency-hopping pattern 21, but offset by one time slot, while the frequency-hopping pattern of basic network 34 is to be offset two time slots from frequency-hopping pattern of FIG. 2.

This now means that at time t=0, basic network 32 is transmitting over channel 7, basic network 33 over channel 50, and basic network 34 over channel 10. At time t=1, basic networks 32, 33, 34 are therefore transmitting over channels 50, 10, 60. Since the channels do not repeat within frequency-hopping pattern 21, basic networks 32, 33, 34 are therefore transmitting over different channels in each time slot, so that mutual interference in edge regions cannot occur. In other words, the frequency-hopping patterns of basic networks 32, 33, 34 are orthogonal to one another.

Basic network 35 is so far away from basic network 32 that a wireless connection between user stations or central stations of these two basic networks 32, 35 is not possible. Basic network 35 can therefore reuse frequency-hopping pattern 21 of FIG. 2, so that it is always transmitting or receiving over the same channel as basic network 32. Because of the physical distance between the two basic networks 32 and 35, however, mutual interference does not occur.

Lastly, FIG. 5 shows that each central station 36, 37, 38, 39 and each user station 41, 42, 43, 44, 45, 46 has two antennas in each case, comprising one transmission antenna 53 and one reception antenna 54, as is shown for user station 46.

What is claimed is:

1. A method for transferring data packets in a network of multiple user stations, the data packets being transferred over a set of channels with the frequency-hopping method and the channels being in this context selected for data transfer in accordance with at least one frequency-hopping pattern in temporal succession, in which the network is divided into at least two basic networks, each with a central station and a limited number of user stations; and in each basic network a separate frequency-hopping pattern is processed that is orthogonal to the frequency-hopping pattern of immediately adjacent basic networks, wherein data packets are exchanged for synchronization purposes between the first central station and the second central station via one of the user stations connected to the first central station, wherein the first central station is connected to the one of the user stations via a wireless connection and the second central station is connected to the one of the user stations via a wired connection.

2. The method of claim 1, wherein each basic network services up to 256, preferably up to 20, user stations.

3. The method of claim 1, wherein the set of channels lies in a frequency band that is used by primary users, such that before a potential data transfer, a particular channel selected by the network of user stations is checked to determine whether a primary user is occupying that channel at the time, and as a function of that check either a data packet is transferred over the selected channel, or the next channel in the particular frequency-hopping pattern is selected for checking and potential data transfer.

4. The method of claim 1, wherein the user stations of a basic network are operated synchronously with one another and reciprocally with respect to the particular central station.

5. The method of claim 1, wherein the basic networks are synchronized with one another in such a way that all the central stations are transmitting or receiving simultaneously.

6. A network for transferring data packets, with multiple user stations, the data packets being transferred over a set of channels with the frequency-hopping method and the channels being in this context selected for data transfer in accordance with at least one frequency-hopping pattern in temporal succession, in which the network has at least two basic networks each with a central station and a limited number of user stations; and a separate frequency-hopping pattern that is orthogonal to the frequency-hopping patterns of immediately adjacent basic networks is allocated to each basic network, wherein the first central station is connected to the second central station for exchanging data packets for synchronization purposes wherein the first central station is connected to the second central station via one of the user stations coupled to the first central station, and wherein the first central station is connected to the second central station by a wireless connection between the first central station and one of the user stations and a wired connection between one of the user stations and the second central station.

7. The network of claim 6, wherein each basic network comprises up to 256, preferably up to 20, user stations.

8. The network of claim 6, wherein the set of channels lies in a frequency band that is used by primary users, such that before a potential data transfer, a particular channel selected by the network of user stations is checked to determine whether a primary user is occupying that channel at the time, and as a function of that check either a data packet is transferred over the selected channel, or the next channel in the particular frequency-hopping pattern is selected for checking and potential data transfer.

9. The network of claim 6, wherein each central station synchronizes a system time in the associated basic network; and the network comprises a synchronization station, connected to the central stations, which generates and emits a synchronizing signal by means of which the individual system times of the basic networks are synchronized with one another.

10. The network of claim 9, wherein at least one central station is connected on a hardware basis to the synchronization station.

11. The network of claim 6, wherein a central station and/or a user station have one transmission and one reception antenna.

12. A method for transferring data packets in a network of multiple user stations, the network being divided into at least two basic networks, each of the basic networks having a central station and user stations, the method comprising:

transferring data packets over a set of channels utilizing frequency-hopping, the channels being selected for data transfer in accordance with at least one frequency-hopping pattern in temporal succession, wherein each basic network employs a separate frequency-hopping pattern that is orthogonal to the frequency-hopping pattern of the immediately adjacent basic networks; and exchanging data packets for synchronization purposes between a central station of one of said at least two basic networks and a central station of another of said at least two basic networks via a user station, wherein the central station of one of said at least two basic networks is connected to a user station via a wireless connection and the central station of another of said at least two basic networks is connected to the user station via a wired connection.

\* \* \* \* \*